United States Patent
Brees (10) Patent No.: US 8,162,612 B2
(45) Date of Patent: Apr. 24, 2012

(54) STAMPED STATOR ASSEMBLIES AND METHODS FOR ASSEMBLYING STAMPED STATOR ASSEMBLIES

(75) Inventor: William Brees, Akron, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 494 days.

(21) Appl. No.: 12/381,447

(22) Filed: Mar. 12, 2009

(65) Prior Publication Data

US 2009/0232655 A1     Sep. 17, 2009

Related U.S. Application Data

(60) Provisional application No. 61/069,501, filed on Mar. 14, 2008.

(51) Int. Cl.
*B23P 15/00* (2006.01)
*B23P 15/04* (2006.01)
*B21K 25/00* (2006.01)
*F16D 11/00* (2006.01)

(52) U.S. Cl. .................. 416/197 C; 29/889.5; 192/30 R
(58) Field of Classification Search ........................ None
See application file for complete search history.

(56) References Cited

U.S. PATENT DOCUMENTS

2007/0224042 A1    9/2007    Brees et al.

*Primary Examiner* — Scott B Geyer
(74) *Attorney, Agent, or Firm* — Simpson & Simpson, PLLC (57) ABSTRACT

A stator for a torque converter, including a pump side blade plate with a first outer circumferential portion and a turbine side blade plate with a second outer circumferential portion in contact with the first outer circumferential portion. One of the first or second outer circumferential portions includes an axially extending lip with a plurality of notches and the other of the first or second outer circumferential portions includes a plurality of radially outward protrusions disposed in the plurality of notches and the lip includes a plurality of at least partially radially inward protrusions in contact with other of the first or second outer circumferential portions and exerting force on the other of the first or second outer circumferential portions to urge the pump and turbine side plates together.

15 Claims, 9 Drawing Sheets

STAMPED STATOR ASSEMBLIES AND METHODS FOR ASSEMBLYING STAMPED STATOR ASSEMBLIES

CROSS-REFERENCE TO RELATED APPLICATIONS

This application claims the benefit under 35 U.S.C. §119(e) of U.S. Provisional Application No. 61/069,501 filed on Mar. 14, 2008 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a two-plate stator assembly and method for assembling a two-plate stator.

BACKGROUND OF THE INVENTION

Commonly owned U.S. Published Patent Application No. 2007/0224042 A1 discloses using riveting, welding, tab rolling, adhesives, or clinching to secure a stamped multi-plate stator. However, riveting requires creating holes in the plates for the rivets and additional steps and equipment to place and upset the rivet. Welding is problematic because welding can be time consuming and may distort the stator by adding too much heat to the stator.

Thus, there is a long-felt need for a stamped multi-plate stator that can be assembled with a minimal amount to time and cost and without negatively impacting the structure of the stator.

BRIEF SUMMARY OF THE INVENTION

The present invention broadly comprises a stator for a torque converter, including: a pump side blade plate with a first outer rim; a turbine side blade plate with a second outer rim; and brazing material disposed between the first and second outer rims and fixedly securing the pump side blade plate to the turbine side blade plate. In a preferred embodiment, the pump side blade plate and the turbine side blade plate include first and second inner circumferential sections connected to first and second pluralities of blades, respectively, the first and second outer rims are in the shape of respective annular rings connected to the first and second pluralities of blades, respectively, the first outer rim, the first plurality of blades, and the first inner circumferential section are formed from a first single piece of material, and the second outer rim, the second plurality of blades, and the second inner circumferential section are formed from a second single piece of material. In another preferred embodiment, the stator includes a one-way clutch disposed between the pump side blade plate and the turbine side blade plate.

The present invention broadly comprises a stator for a torque converter, including: a pump side blade plate with a first outer circumferential portion; and a turbine side blade plate with a second outer circumferential portion in contact with the first outer circumferential portion. One of the first or second outer circumferential portions includes an axially extending lip with a plurality of notches and the other of the first or second outer circumferential portions includes a plurality of radially outward protrusions disposed in the plurality of notches and the lip includes a plurality of at least partially radially inward protrusions in contact with other of the first or second outer circumferential portions and exerting force on the other of the first or second outer circumferential portions to urge the pump and turbine side plates together.

In a preferred embodiment, the pump side blade plate and the turbine side blade plate include first and second inner circumferential sections connected to first and second pluralities of blades, respectively, the first and second outer circumferential portions are connected to the first and second pluralities of blades, respectively, wherein the first outer circumferential portion, the first plurality of blades, and the first inner circumferential section are formed from a first single piece of material, and the second outer circumferential portion, the second plurality of blades, and the second inner circumferential section are formed from a second single piece of material.

In another preferred embodiment, the lip includes an end and the plurality of at least partially radially inward protrusions is respective portions of the end extending radially inward. In one embodiment, the other of the first or second outer circumferential portions includes a first radial side and the respective portions of the axial end include respective radial sides parallel to and in contact with a second radial side on the other of the first or second outer circumferential segments.

In another embodiment, the other of the first or second outer circumferential segments includes an outer circumferential surface and a radial side and the plurality of at least partially radially inward protrusions are in contact with an edge between the outer circumferential surface and the radial side and otherwise substantially free of contact with the outer circumferential surface and the radial side. The lip includes a plurality of openings surrounded by the lip and the plurality of at least partially radially inward protrusions is continuous with respective openings in the plurality of openings. In a further preferred embodiment, the stator includes a one-way clutch disposed between the pump side blade plate and the turbine side blade plate.

The present invention also broadly comprises methods for assembling a stator.

It is a general object of the present invention to provide a stamped multi-plate stator that is assembled with a minimal amount to time and cost without negatively impacting the structure of the stator.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
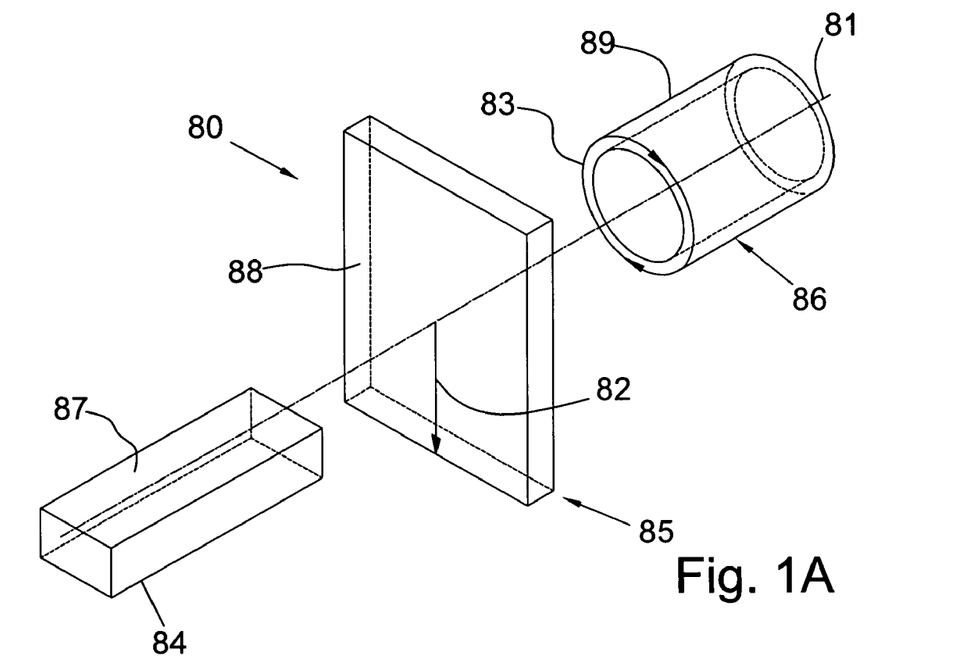
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
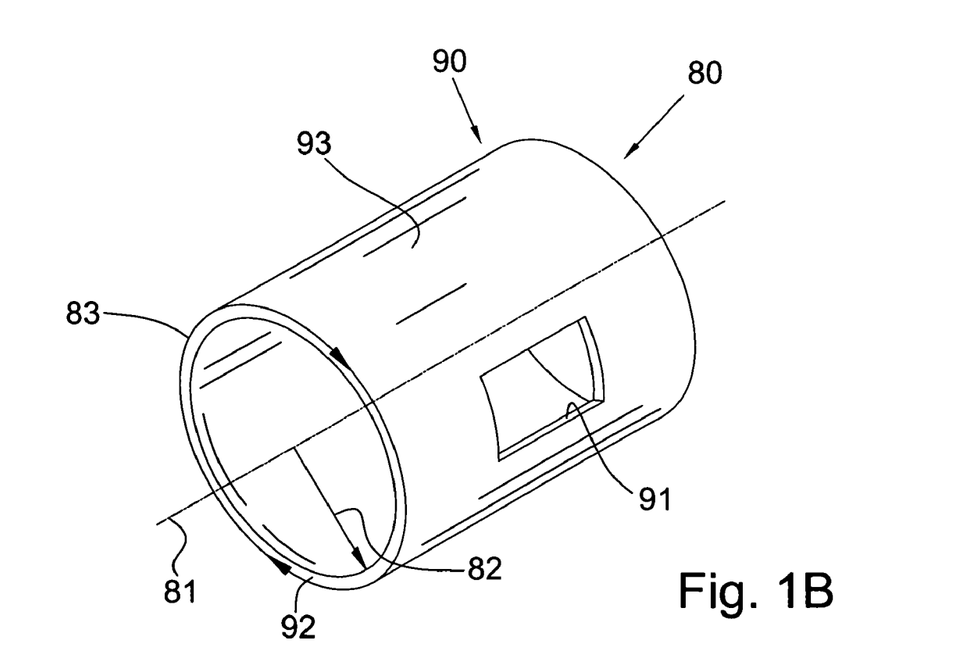
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
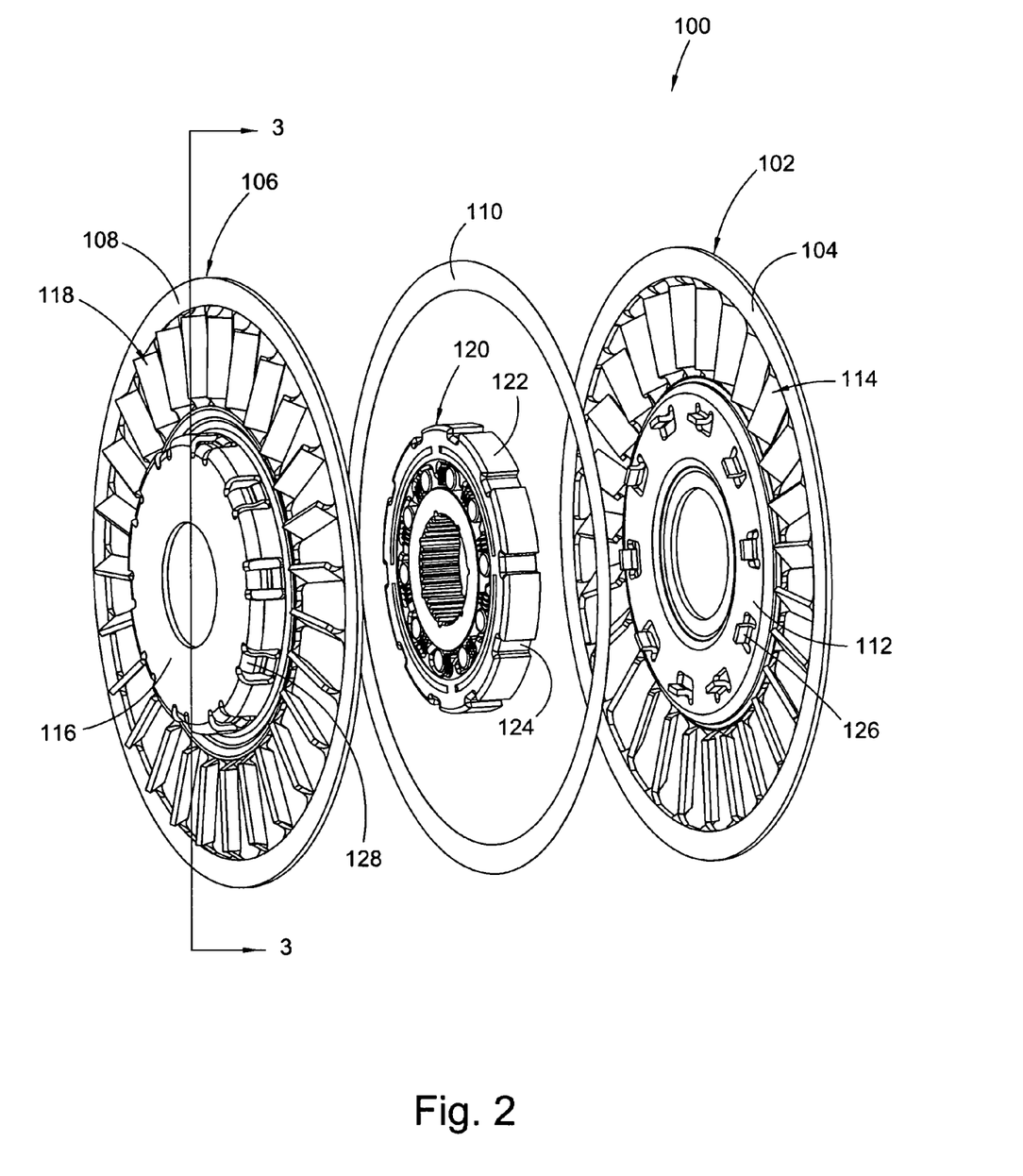
FIG. 2 is an exploded front perspective view of a present invention stamped stator assembly.

FIG. 2 is an exploded front perspective view of present invention stamped stator assembly 100.

Figure 3:
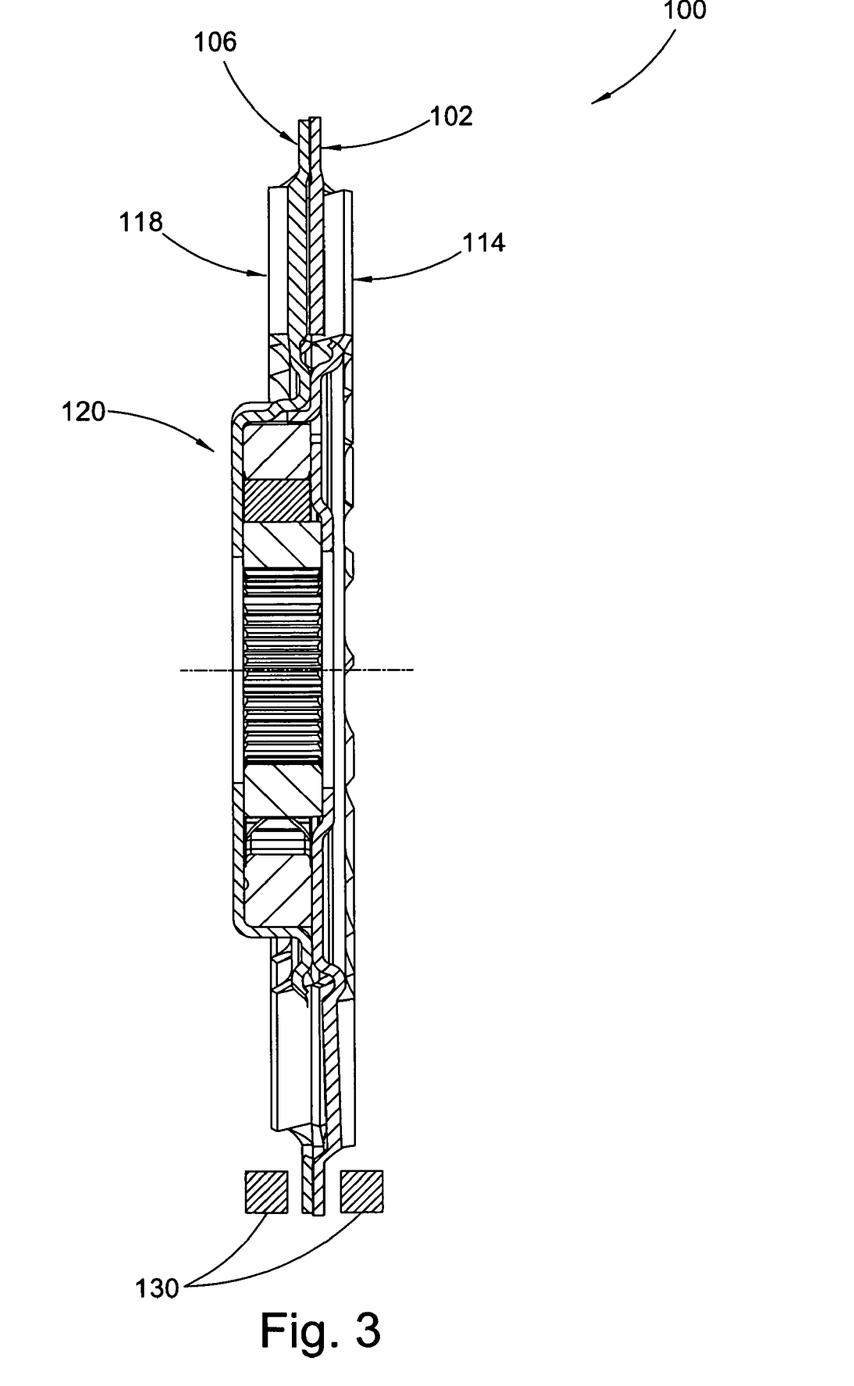
FIG. 3 is a cross-sectional view of the assembly shown in FIG. 2, generally along line 3-3 in FIG. 2.

FIG. 3 is a cross-sectional view of assembly 100 shown in FIG. 2, generally along line 3-3 in FIG. 2. The following should be viewed in light of FIGS. 2 and 3. Stator assembly, or stator, 100 includes pump side blade plate 102 with outer rim 104; turbine side blade plate 106 with an outer rim 108; and brazing material 110 disposed between the outer rims. The brazing material fixedly secures the pump side blade plate to the turbine side blade plate. The outer rims are in the shape of respective annular rings. The brazing material is shown as a solid ring; however, it should be understood that the material can be disposed intermittently, for example, as dots or stripes.

The pump side blade plate includes inner circumferential section 112 connected to plurality 114 of blades and the turbine side blade plate includes inner circumferential section 116 connected to plurality 118 of blades. Rim 104, blades 114, and section 112 are formed from a single piece of material. Rim 108, blades 118, and section 116 are formed from a different, single piece of material. In a preferred embodiment, plates 102 and 106 are formed by stamping a respective disc of material (not shown). In another preferred embodiment, stator 100 includes one-way clutch 120 disposed between the pump side blade plate and the turbine side blade plate. The clutch can be any clutch known in the art. The clutch is axially retained by sections 112 and 116.

Clutch 120 includes outer race 122 with recesses, or slots, 124. Plates 102 and 106 include tabs 126 and indents 128, arranged to interlock with the slots, and rotationally connect the clutch and the plates, when the plates are joined together. By rotationally connected, or secured, we mean that the clutch and the plates are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other.

Clutch 120 is "encased" by plates 102 and 106; therefore, the brazing material cannot be melted until the clutch is disposed between the plates. However, portions of clutch 120 are hardened metal; therefore, melting the brazing material by placing the assembled stator in a brazing oven would undesirably anneal the hardened portions. Therefore, heating of the assembly is limited to the outer circumferences by placing the outer circumference between heating coils, for example, induction heating coils 130. Induction coils are desirable because such coils are capable of rapidly heating steel. Coils 130 can be a single pair of coils that substantially surround the outer circumferential segments, or can be one or more pairs of coils that substantially surround or only partially surround the outer circumferential segments. In the latter case, the assembly is rotated between the coils to ensure that all portions of the outer circumferential segments are sufficiently heated. In this manner, the clutch is not subjected to heat that could anneal the hardened parts.

Figure 4:
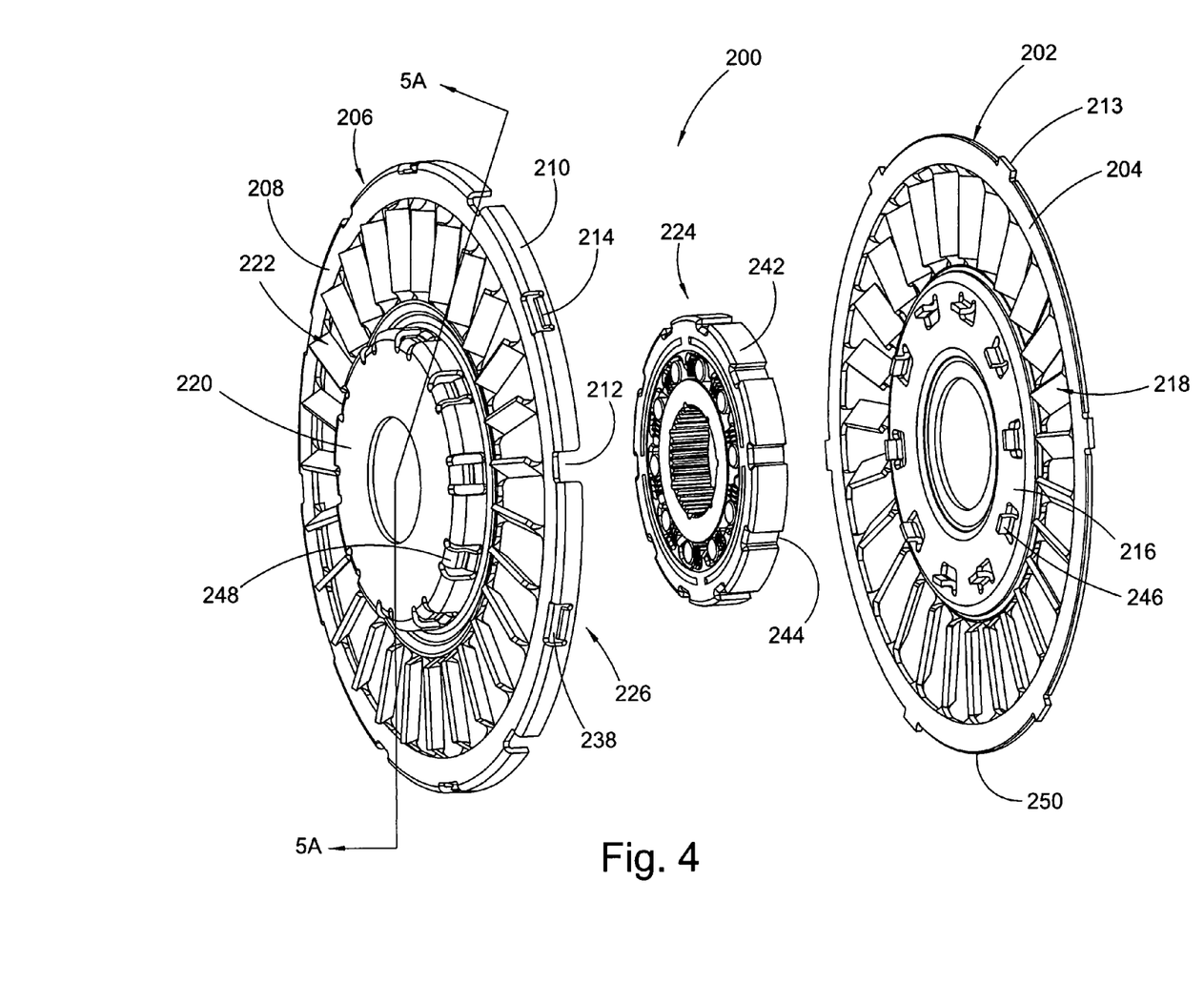
FIG. 4 is an exploded front perspective view of a present invention stamped stator assembly.

FIG. 4 is an exploded front perspective view of present invention stamped stator assembly 200.

Figure 5A:
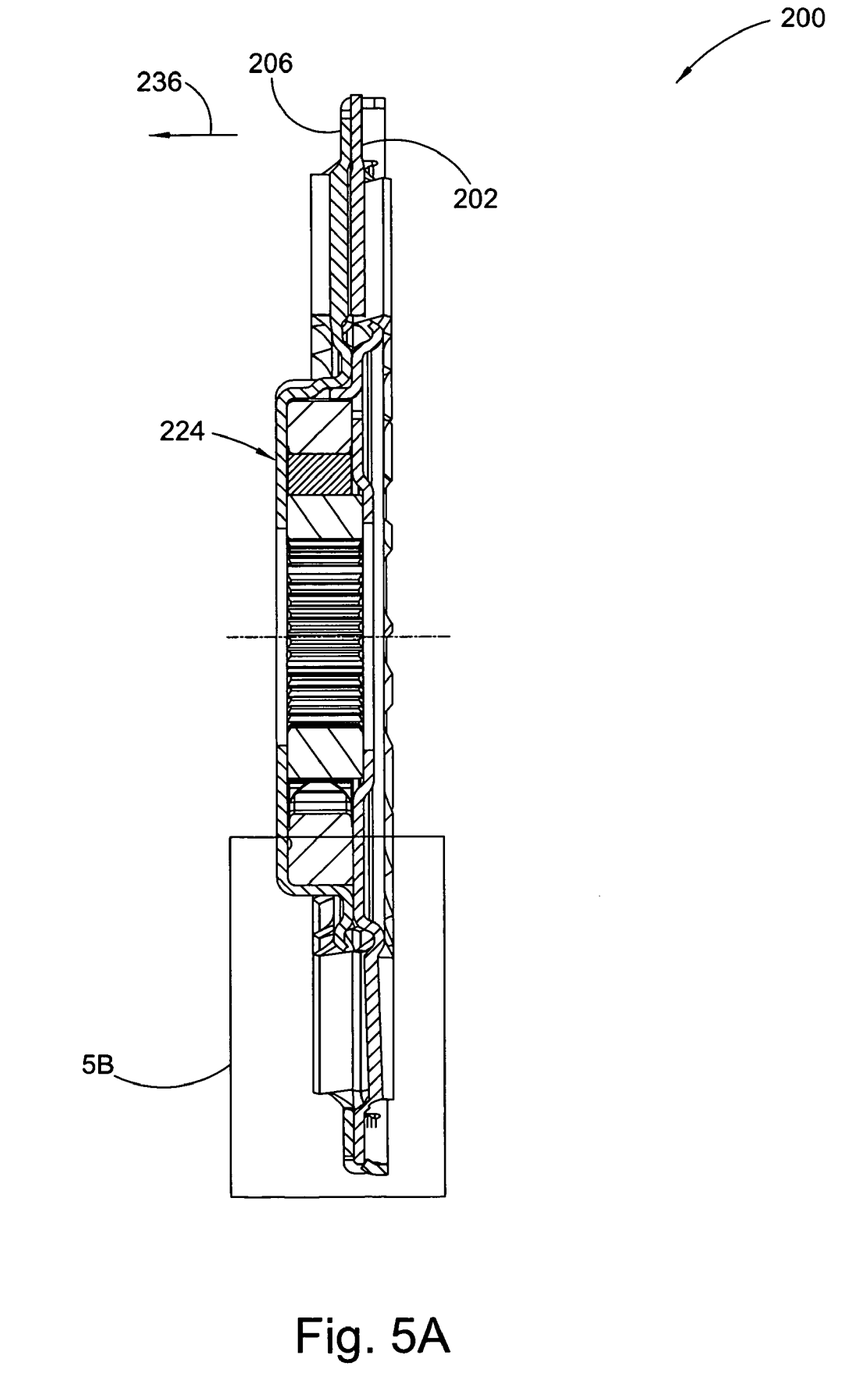
FIG. 5A is a cross-sectional view of the assembly shown in FIG. 4, generally along line 5A-5A in FIG. 4.

FIG. 5A is a cross-sectional view of the assembly shown in FIG. 4, generally along line 5A-5A in FIG. 4.

Figure 5B:
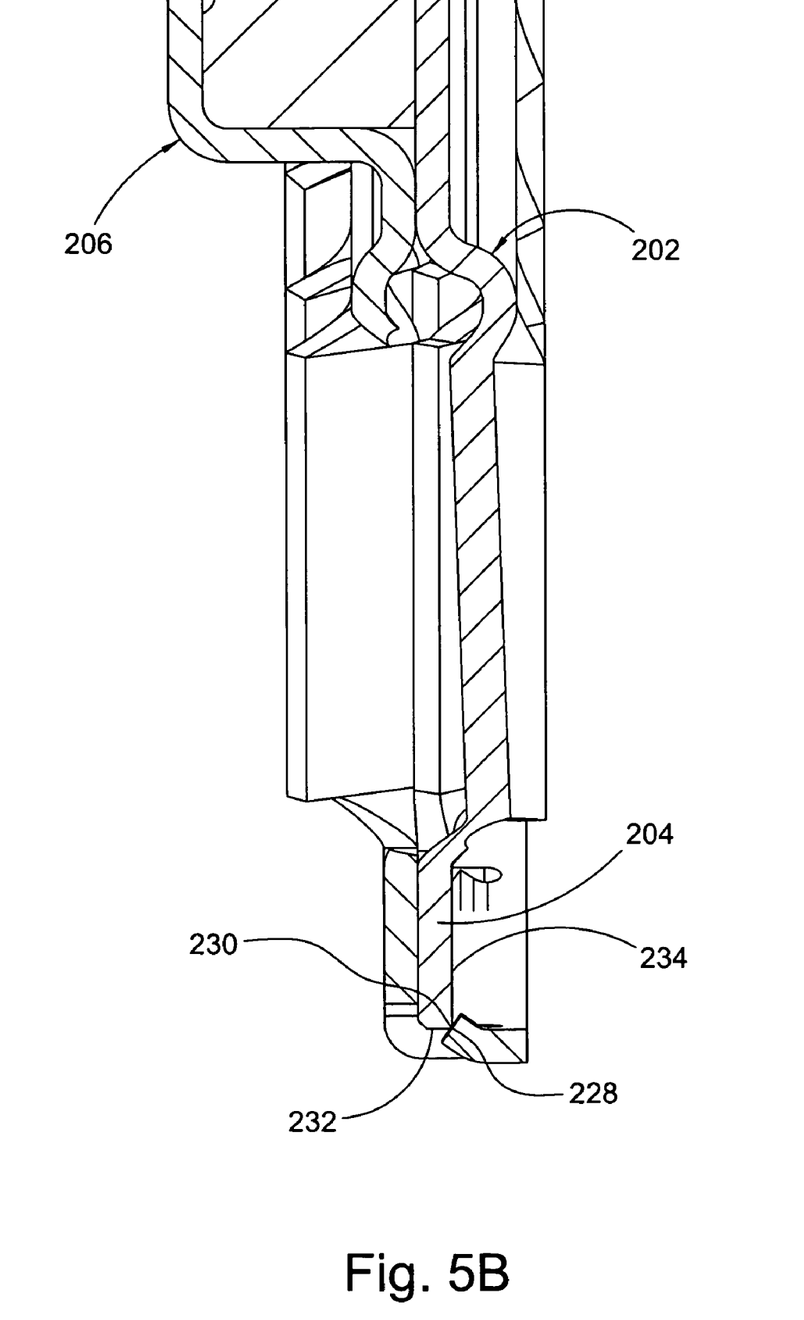
FIG. 5B is a view of area 5B in FIG. 5A.

FIG. 5B is a view of area 5B in FIG. 5A. The following should be viewed in light of FIGS. 4 through 5B. Stator assembly, or stator, 200 includes pump side blade plate 202 with outer circumferential portion 204; and turbine side blade plate 206 with outer circumferential portion 208 in contact with outer circumferential portion 204. One of the outer circumferential portions includes an axially extending lip with a plurality of notches and the other of the outer circumferential portions includes a plurality of radially outward protrusions disposed in the plurality of notches. In the figures, axially extending lip 210 with notches 212 is shown for portion 208 and tabs 213 are shown for portion 204. However, it should be understood that this configuration can be reversed, for example, the lip can be part of portion 204 and the tabs can be formed in portion 208. When plates 202 and 206 are joined together, tabs 213 interlock with respective notches 212 to rotationally connect the plates. Through the connection of tabs 213 and notches 212, plate 202 transfers torque to plate 206.

The lip includes a plurality of at least partially radially inward protrusions in contact with the other of the outer circumferential portions. In the figures, protrusions 214 are shown for portion 208 and in contact with portion 204. However, it should be understood that this configuration can be reversed, for example, the protrusions can be part of portion 204 and in contact with portion 208. Protrusions 214 exert force on portion 204 urge the pump and turbine side plates together.

The pump side blade plate includes inner circumferential section 216 connected to plurality 218 of blades and the turbine side blade plate includes inner circumferential section 220 connected to plurality 222 of blades. Rim 204, blades 218, and section 216 are formed from a single piece of material. Rim 208, blades 222, and section 220 are formed from a different, single piece of material. In a preferred embodiment, plates 202 and 206 are formed by stamping a respective disc of material (not shown). In another preferred embodiment, stator 200 includes one-way clutch 224 disposed between the pump side blade plate and the turbine side blade plate. The clutch can be any clutch known in the art. The clutch is axially retained by sections 212 and 216.

Protrusions 214 are "snap" connectors formed (as described infra) by punching portions 226 of lip 210 and partially bending the punched portions radially inward. This partial inward bending is best seen in FIG. 5B. As a result, ends 228 contact edge 230 between outer circumferential surface 232 and radial side 234 of segment 204. Due to the partial bending, contact between protrusions 214 and portion 204 is substantially limited to edge 230. The partial bending also results in the protrusions applying force on segment 204 in axial direction 236, forcing segments 204 and 208 together. Punching portions 226 results in openings 238, surrounded by the lip, and also results in respective protrusions being continuous with respective openings 238.

One-way clutch 224 includes outer race 242 with recesses, or slots, 244. Plates 202 and 206 include tabs 246 and indents 248, respectively, arranged to interlock with the slots, and rotationally connect the clutch and the plates, when the plates are joined together. Outer circumferential rim 250 of the pump side plate makes a secure fit with segment 208. If axial bending occurs in assembly 200, the pump side plate grows to a larger diameter than the turbine side plate due to the axial position of the plates. Lip 210 supports rim 250 in the radial direction to counteract the radial difference between the turbine and pump plates. Therefore, the support afforded by the lip reduces any axial deflection that may occur in the assembly.

Figure 6:
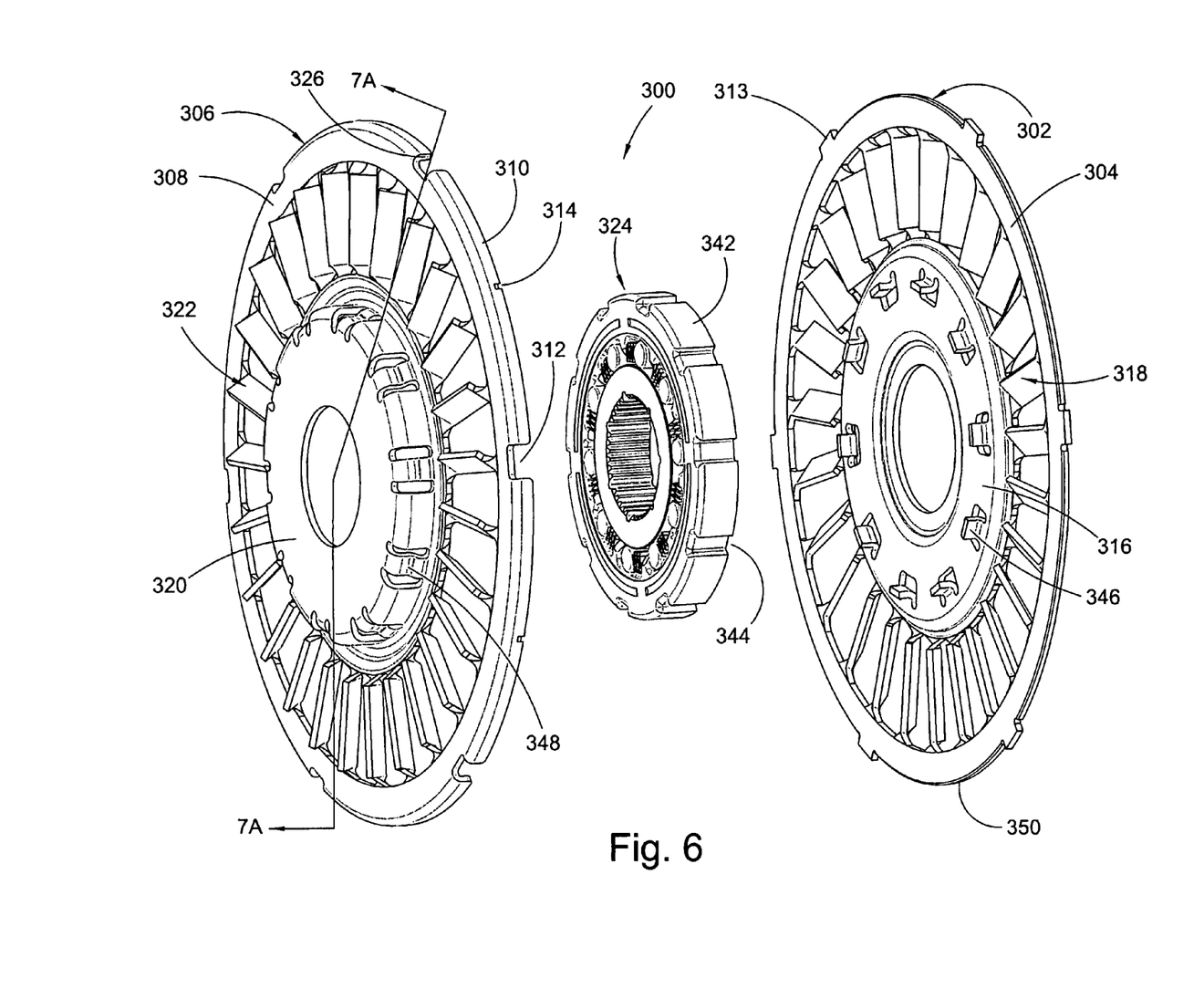
FIG. 6 is an exploded front perspective view of a present invention stamped stator assembly.

FIG. 6 is an exploded front perspective view of present invention stamped stator assembly 200.

Figure 7A:
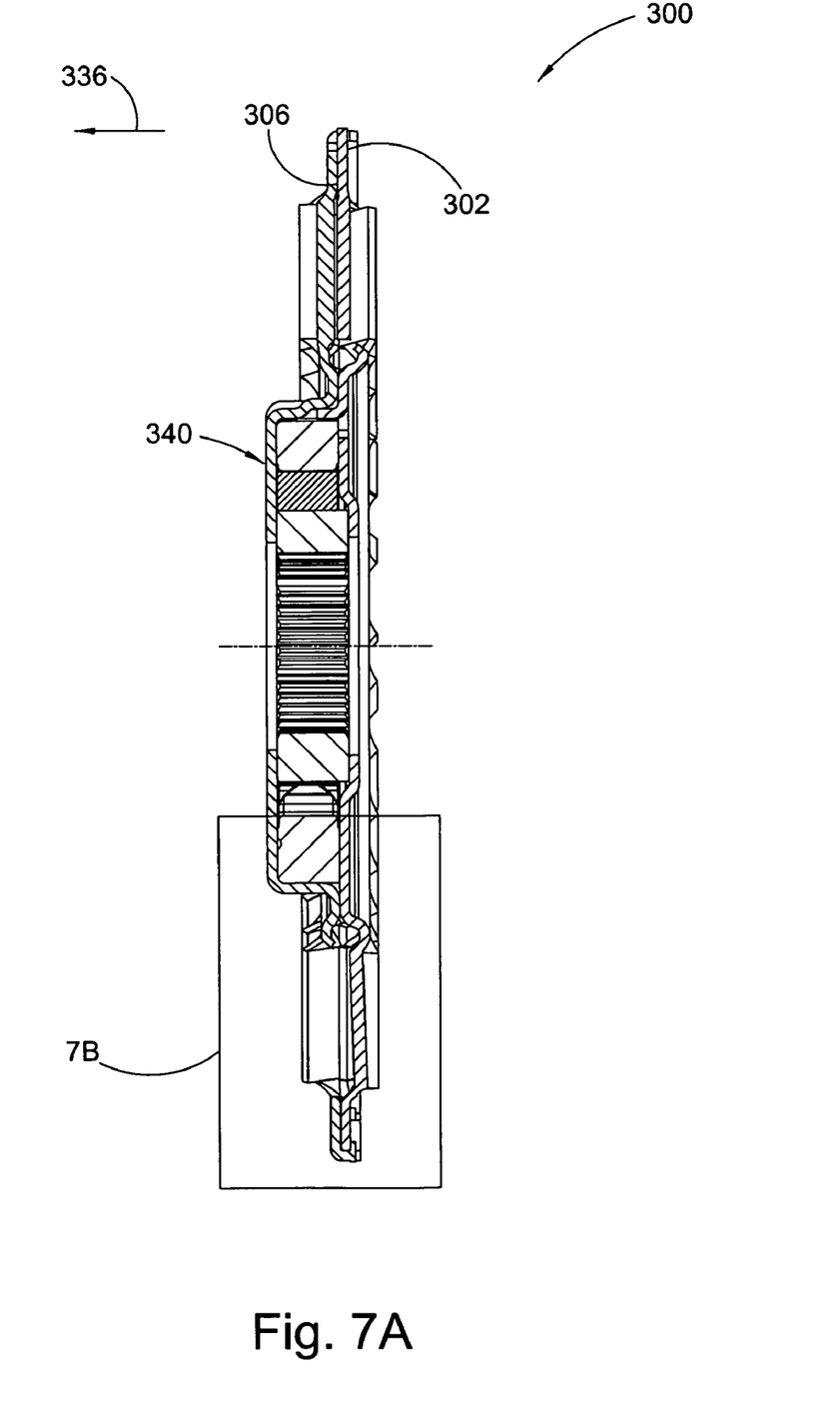
FIG. 7A is a cross-sectional view of the assembly shown in FIG. 6, generally along line 7A-7A in FIG. 6; and, FIG. 7B is a view of area 7B in FIG. 7A.

FIG. 7A is a cross-sectional view of the assembly shown in FIG. 6, generally along line 7A-7A in FIG. 6.

Figure 7B:
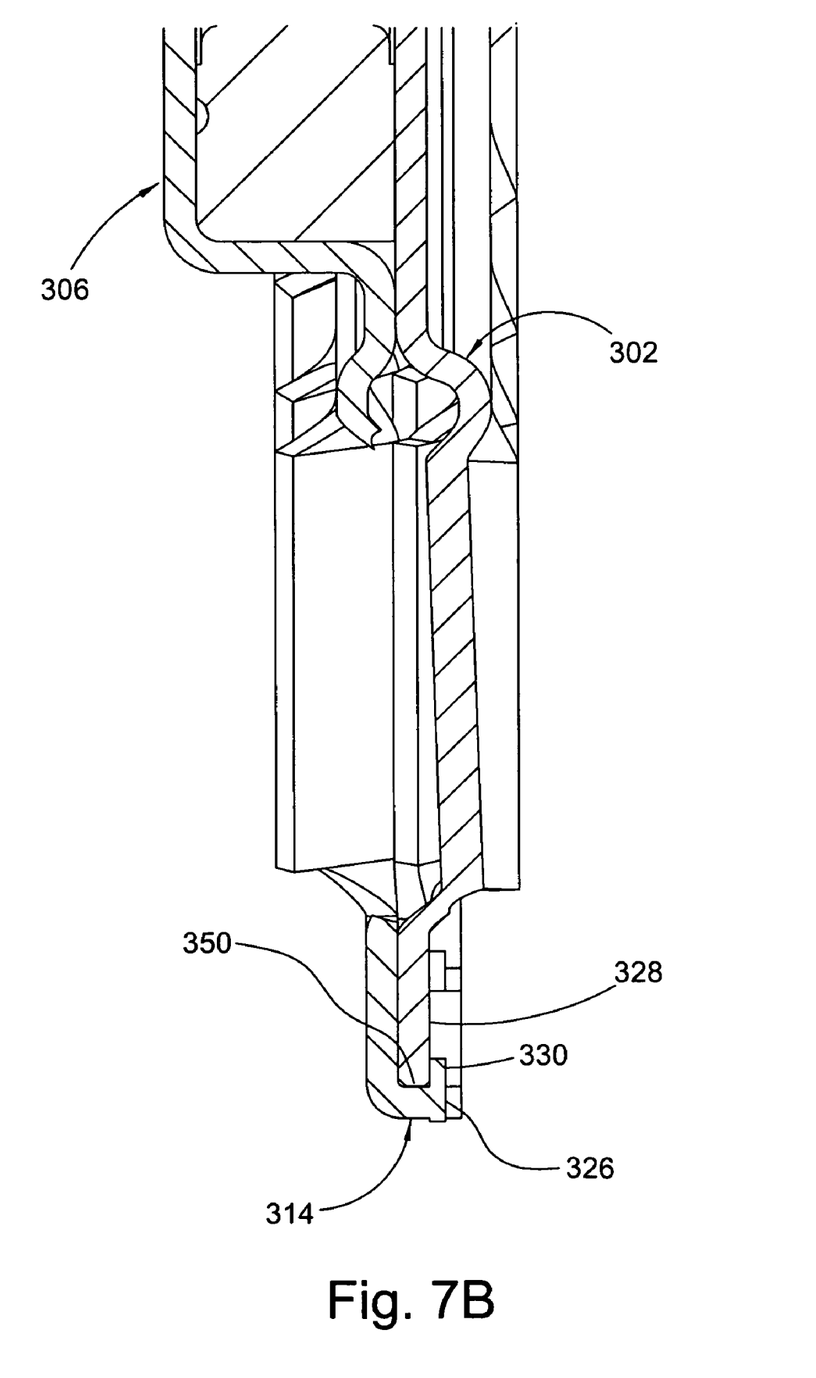

FIG. 7B is a view of area 7B in FIG. 7A. The following should be viewed in light of FIGS. 6 through 7B. Stator assembly, or stator, 300 includes pump side blade plate 302 with outer circumferential portion 304; and turbine side blade plate 306 with outer circumferential portion 308 in contact with outer circumferential portion 304. One of the outer circumferential portions includes an axially extending lip with a plurality of notches and the other of the outer circumferential portions includes a plurality of radially outward protrusions disposed in the plurality of notches. In the figures, axially extending lip 310 with notches 312 is shown for portion 308 and tabs 313 are shown for portion 304. However, it should be understood that this configuration can be reversed, for example, the lip can be part of portion 304 and the tabs can be formed in portion 308. When plates 302 and 306 are joined together, tabs 313 interlock with respective notches 312 to rotationally connect the plates. Through the connection of tabs 313 and notches 312, plate 302 transfers torque to plate 306.

The lip includes a plurality of at least partially radially inward protrusions in contact with other of the outer circumferential portions. In the figures, protrusions 314 are shown for portion 308 and in contact with portion 304. However, it should be understood that this configuration can be reversed, for example, the protrusions can be part of portion 304 and in contact with portion 308. Protrusions 314 exert force on portion 304 urge the pump and turbine side plates together.

The pump side blade plate includes inner circumferential section 316 connected to plurality 318 of blades and the turbine side blade plate includes inner circumferential section 320 connected to plurality 322 of blades. Rim 304, blades 318, and section 316 are formed from a single piece of material. Rim 308, blades 322, and section 320 are formed from a different, single piece of material. In a preferred embodiment, plates 302 and 306 are formed by stamping a respective disc of material (not shown). In another preferred embodiment, stator 300 includes one-way clutch 324 disposed between the pump side blade plate and the turbine side blade plate. The clutch can be any clutch known in the art. The clutch is axially retained by sections 312 and 316.

Protrusions 314 are "stake" connectors formed (as described infra) by applying force to respective portions of radial surface, or end, 326 of lip 310 and partially bending the punched portions radially inward. This partial inward bending is best seen in FIG. 7B. Plate 302 includes radial wall 328 and the protrusions, or respective portions of end 326, include radial wall 330 in contact with wall 328. The contact between the radial walls results in the protrusions applying force on segment 304 in axial direction 336, forcing segments 304 and 308 together.

One-way clutch 324 includes outer race 342 with recesses, or slots, 344. Plates 302 and 306 include tabs 346 and indents 348, arranged to interlock with the slots, and rotationally connect the clutch and the plates, when the plates are joined together. Outer circumferential rim 350 of the pump side plate makes a secure fit with segment 308. If axial bending occurs in assembly 300, the pump side plate grows to a larger diameter than the turbine side plate due to the axial position of the plates. Lip 310 supports rim 350 in the radial direction to counteract the radial difference between the turbine and pump plates. Therefore, the support afforded by the lip reduces any axial deflection that may occur in the assembly.

The following should be viewed in light of FIGS. 2 through 3C. The following describes a present invention method for assembling a stator for a torque converter. Although the method is presented as a sequence of steps for clarity, no order should be inferred from the sequence unless explicitly stated. A first step applies brazing paste to one or both of first or second outer rims for a pump side blade plate and a turbine side blade plate, respectively. A second step disposes a one-way clutch between the pump side blade plate and the turbine side blade plate. A third step places the pump side blade plate and the turbine side blade plate in alignment so that the brazing paste and the first and second outer rims are in contact. A fourth step heats the first and second outer rims with at least one pair of heating elements to braze the first and second outer rims together. In a preferred embodiment, the heating elements are induction heating elements.

As noted supra, undesirably annealing of the one-way clutch in the stator is avoided by limiting heating of the assembly to the outer circumferences by placing the outer circumference between the heating coils, for example, induction heating coils 130. Induction coils are desirable because such coils are capable of rapidly heating steel. Coils 130 can be a single pair of coils that substantially surround the outer circumferential segments, or can be one or more pairs of coils that substantially surround or only partially surround the outer circumferential segments. In the latter case, the assembly is rotated between the coils to ensure that all portions of the outer circumferential segments are sufficiently heated. In this manner, the clutch is not subjected to heat that could anneal the hardened parts.

In a preferred embodiment, the pump side blade plate and the turbine side blade plate include first and second inner circumferential sections connected to first and second pluralities of blades, respectively, wherein the first and second outer rims are in the shape of respective annular rings connected to the first and second pluralities of blades, respectively, wherein the first outer rim, the first plurality of blades, and the first inner circumferential section are formed from a first single piece of material, and wherein the second outer rim, the second plurality of blades, and the second inner circumferential section are formed from a second single piece of material.

The following should be viewed in light of FIGS. 4 through 7C. The following describes a present invention method for assembling a stator for a torque converter. Although the method is presented as a sequence of steps for clarity, no order should be inferred from the sequence unless explicitly stated. A first step forms a plurality of notches in one of a first outer circumferential segment of a pump side blade plate or a second outer circumferential segment of a turbine side blade plate. A second step forms a plurality of radially outward protrusions on the other of the first or second outer circumferential segments. A third step disposes the plurality of radially outward protrusions in the plurality of notches. A fourth step places the first and second outer circumferential segments in contact. A fifth step contacts a plurality of at least partially radially inward protrusions, on the one of the first or second outer circumferential segments, with the other of the first or second outer circumferential segments. A sixth step urges the first and second outer circumferential segments together.

In a preferred embodiment, a seventh step forms the plurality of at least partially radially inward protrusions in the one of the first or second outer circumferential segments. In another preferred embodiment, an eighth step forms an axially extending lip on the one of the first or second outer circumferential segments and forming a plurality of notches includes forming the plurality of notches at least partially in the lip and forming a plurality of at least partially radially inward protrusions includes forming the plurality of at least partially radially inward protrusions by manipulating respective portions of the lip.

In one embodiment, the lip includes an end and manipulating respective portions of the lip includes, after placing the first and second outer circumferential segments in contact, applying axial force to the respective portions to cause at least segments of the respective portions to expand radially inward. That is, a 'staked' connection is made. The other of the first and second outer circumferential segments includes a radial side and applying axial force to the respective portions includes forming respective radial sides, for the at least segments of the respective portions, in contact with the radial side.

In one embodiment, to make the staked connection in the fifth step, a tool is pressed against end 326 in direction 336 to press a portion of end 326 over segment 304, in particular, outer circumference 350.

In another embodiment, the other of the first and second outer circumferential segments includes a radial side, manipulating respective portions of the lip includes, prior to placing the first and second outer circumferential segments in contact, punching respective segments of the lip to form the plurality of at least partially radially inward protrusions, placing the first and second outer circumferential segments in contact includes sliding the other of the first or second outer circumferential segments over the respective punched segments, and contacting the plurality of at least partially radially inward protrusions with the other of the first or second outer circumferential segments includes placing the respective punched segments in contact with an edge formed by an outer circumferential surface of the other of the first or second outer circumferential segments and the radial side. In a further embodiment, contacting the respective punched segments with the edge includes otherwise maintaining the respective punched segments free of contact with the outer circumferential surface and the radial surface.

In one embodiment, the fifth step includes sliding plate 202, in particular, rim 250, over the protrusions, bending the protrusions radially outward. As plate 202 continues to move in direction 236, the plate axially clears the protrusions and the protrusions 'snap' back into place as shown in FIGS. 3A and 3B. Ends 228 contact edge 230 mostly in an axial direction, urging plates 202 and 206 axially together with nominal bending in the protrusions.

In a preferred embodiment, a ninth step disposes a one-way clutch between the pump side blade plate and the turbine side blade plate prior to placing the plates together.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A stator for a torque converter, comprising:
   a pump side blade plate with a first outer circumferential portion; and,
   a turbine side blade plate with a second outer circumferential portion in contact with the first outer circumferential portion, wherein one of the first or second outer circumferential portions includes an axially extending lip with a plurality of notches and the other of the first or second outer circumferential portions includes a plurality of radially outward protrusions disposed in the plurality of notches, wherein the lip includes a plurality of at least partially radially inward protrusions in contact with other of the first or second outer circumferential portions and exerting force on the other of the first or second outer circumferential portions to urge the pump and turbine side plates together.

2. The stator of claim 1 wherein the pump side blade plate and the turbine side blade plate include first and second inner circumferential sections connected to first and second pluralities of blades, respectively, wherein the first and second outer circumferential portions are connected to the first and second pluralities of blades, respectively, wherein the first outer circumferential portion, the first plurality of blades, and the first inner circumferential section are formed from a first single piece of material, and wherein the second outer circumferential portion, the second plurality of blades, and the second inner circumferential section are formed from a second single piece of material.

3. The stator of claim 1 wherein the lip includes an end and wherein the plurality of at least partially radially inward protrusions is respective portions of the end extending radially inward.

4. The stator of claim 3 wherein the other of the first or second outer circumferential portions includes a first radial side and wherein the respective portions of the axial end include respective radial sides parallel to and in contact with a second radial side on the other of the first or second outer circumferential segments.

5. The stator of claim 1 wherein the other of the first or second outer circumferential segments includes an outer circumferential surface and a radial side and wherein the plurality of at least partially radially inward protrusions are in contact with an edge between the outer circumferential surface and the radial side and otherwise substantially free of contact with the outer circumferential surface and the radial side.

6. The stator of claim 1 wherein the lip includes a plurality of openings surrounded by the lip and wherein the plurality of at least partially radially inward protrusions is continuous with respective openings in the plurality of openings.

7. The stator of claim 1 further comprising a one-way clutch disposed between the pump side blade plate and the turbine side blade plate.

8. A method for assembling a stator for a torque converter, comprising the steps of:
   forming a plurality of notches in one of a first outer circumferential segment of a pump side blade plate or a second outer circumferential segment of a turbine side blade plate;
   forming a plurality of radially outward protrusions on the other of the first or second outer circumferential segments;
   disposing the plurality of radially outward protrusions in the plurality of notches;
   placing the first and second outer circumferential segments in contact;
   contacting a plurality of at least partially radially inward protrusions, on the one of the first or second outer circumferential segments, with the other of the first or second outer circumferential segments; and,
   urging the first and second outer circumferential segments together.

9. The method of claim 8 further comprising forming the plurality of at least partially radially inward protrusions in the one of the first or second outer circumferential segments.

10. The method of claim 9 further comprising forming an axially extending lip on the one of the first or second outer circumferential segments, wherein forming a plurality of notches includes forming the plurality of notches at least partially in the lip and wherein forming a plurality of at least partially radially inward protrusions includes forming the plurality of at least partially radially inward protrusions by manipulating respective portions of the lip.

11. The method of claim 10 wherein the lip includes an end and wherein manipulating respective portions of the lip includes, after placing the first and second outer circumferential segments in contact, applying axial force to the respective portions to cause at least segments of the respective portions to expand radially inward.

12. The method of claim 11 wherein the other of the first and second outer circumferential segments includes a radial side and wherein applying axial force to the respective portions includes forming respective radial sides, for the at least segments of the respective portions, in contact with the radial side.

13. The method of claim 10 wherein the other of the first and second outer circumferential segments includes a radial side, wherein manipulating respective portions of the lip includes, prior to placing the first and second outer circumferential segments in contact, punching respective segments of the lip to form the plurality of at least partially radially inward protrusions, wherein placing the first and second outer circumferential segments in contact includes sliding the other of the of the first or second outer circumferential segments over the respective punched segments, wherein contacting the plurality of at least partially radially inward protrusions with the other of the first or second outer circumferential segments includes placing the respective punched segments in contact with an edge formed by an outer circumferential surface of the other of the first or second outer circumferential segments and the radial side.

14. The method of claim 13 wherein contacting the respective punched segments with the edge includes otherwise maintaining the respective punched segments free of contact with the outer circumferential surface and the radial surface.

15. The method of claim 8 further comprising the step of disposing a one-way clutch between the pump side blade plate and the turbine side blade plate.

* * * * *